United States Patent
Du et al.

(10) Patent No.: US 8,809,488 B2
(45) Date of Patent: Aug. 19, 2014

(54) CARBOXYLATED POLYMERS OF INTRINSIC MICROPOROSITY (PIMS) WITH TUNABLE GAS TRANSPORT PROPERTIES

(75) Inventors: Naiying Du, Ottawa (CA); Michael D. Guiver, Ottawa (CA); Gilles P. Robertson, Gatineau (CA); Jingshe Song, Sugar Land, TX (US)

(73) Assignee: National Research Council of Canada, Ottawa, ON (CA)

( * ) Notice: Subject to any disclaimer, the term of this patent is extended or adjusted under 35 U.S.C. 154(b) by 232 days.

(21) Appl. No.: 13/266,304

(22) PCT Filed: Mar. 10, 2010

(86) PCT No.: PCT/CA2010/000323
§ 371 (c)(1),
(2), (4) Date: Oct. 26, 2011

(87) PCT Pub. No.: WO2010/124359
PCT Pub. Date: Nov. 4, 2010

(65) Prior Publication Data
US 2012/0041084 A1  Feb. 16, 2012

Related U.S. Application Data

(60) Provisional application No. 61/213,031, filed on Apr. 30, 2009.

(51) Int. Cl.
*C08G 59/02* (2006.01)
*C08G 65/00* (2006.01)
*C08J 5/20* (2006.01)
*C08J 5/22* (2006.01)

(52) U.S. Cl.
USPC ........... 528/403; 528/272; 528/274; 528/288; 528/302; 528/303; 528/489; 528/499; 521/27

(58) Field of Classification Search
USPC ......... 528/272, 274, 302, 303, 307, 288, 403, 528/489, 499; 521/27
See application file for complete search history.

(56) References Cited

FOREIGN PATENT DOCUMENTS

| WO | 2005/012397 A2 | 2/2005 |
|---|---|---|
| WO | 2005/113121 A1 | 12/2005 |
| WO | 2010/048694 A1 | 5/2010 |

OTHER PUBLICATIONS

Budd PM, Ghanem BS, Makhseed S, McKeown NB, Msayib KJ, Tattershall CE. (2004a) Chem. Commun. 230-231.
Budd PM, Elabas ES, Ghanem BS, Makhseed S, McKeown NB, Msayib KJ, Tattershall CE, Wong D. (2004b) Adv. Mater. 16, 456-459.
Budd PM, Msayib KJ, Tattershall CE, Reynolds KJ, McKeown NB, Fritsch D. (2005) J. Membr. Sci. 251, 263-269.
Budd PM, McKeown NB, Ghanem BS, Msayib KJ, Fritsch D, Starannikova L, Belov N, Sanfirova O, Yampolskii Y, Shantarovich V. (2008) J. Membr. Sci. 325, 851-860.
Carta M, Msayib KJ, Budd PM, McKeown NB. (2008) Org. Lett. 10, 2641-2643.

(Continued)

*Primary Examiner* — Duc Truong
(74) *Attorney, Agent, or Firm* — Catherine Lemay (57) ABSTRACT

A film of a carboxylated polymer of formula (I): wherein the sum of x, y and z is an integer from 10 to 10,000 and degree of hydrolysis is 0.05 or greater provides gas separation materials in which the degree of hydrolysis may be used to tune the selectivity of the gases to an optimal required range. Such films may be prepared by casting a film of a polymer of formula (II): wherein n is an integer from 10 to 10,000, and hydrolyzing all or a portion of the —CN groups to form —COOH groups.

20 Claims, 4 Drawing Sheets

(56) References Cited

OTHER PUBLICATIONS

Dai Y, Guiver MD, Robertson GP, Kang YS, Lee KJ, Jho JY. (2004) Macromolecules. 37, 1403-1410.

Davankov VA, Tsyurupa MP. (1990) React. Polym. 13, 27-42.

Du N, Robertson GP, Song J, Pinnau I, Thomas S, Guiver MS. (2008) Macromolecules. 41, 9656-9662.

Du N, Robertson GP, Pinnau I, Thomas S, Guiver Md. (2009) Macromolecular Rapid Communications. 30, 584-588.

Du N, Robertson GP, Song J, Pinnau I, Guiver MD. (2009) Macromolecules. 42, 6038-6043.

Ghanem BS, McKeown NB, Budd PM, Fritsch D. (2008) Macromolecules. 41(5), 1640-1646.

Masuda T, Isobe E, Higashimura T, Takada K. (1983) J. Am. Chem. Soc. 105, 7473-7474.

McKeown NB, Budd PM, Msayib KJ, Ghanem BS, Kingston HJ, Tattershall CE, Makhseed S, Reynolds KJ, Fritsch D. (2005b) Chem. Eur. J. 11, 2610-2620.

Nagai K, Masuda T, Nakagawa T, Freeman BD, Pinnau I. (2001) Prog. Polym. Sci. 26, 721-798.

Pinnau I, Toy LG. (1996) J. Membr. Sci. 116, 199-209.

Robeson LM. (1991) J. Membr. Sci. 62, 165-185.

Robeson LM. (2008) J. Membr. Sci. 320, 390-400.

Staiger CL, Pas SJ, Hill AJ, Cornelius C. (2008) J. Chem. Mater. 20, 2606-2008.

Tanaka K, Okano M, Toshino H, Kita H, Okamoto KI. (1992) J. Polym.Sci., Polym. Phys. 30, 907-914.

Tsyurupa MP, Davankov VA. (2002) React. Funct. Polym. 53,193-203.

Urban C, McCord EF, Webster OW, Abrams L, Long HW, Gaede H, Tang P, Pines A. (1995) Chem. Mater. 7, 1325-1332.

Weber J, Su Q, Antonietti M, Thomas A. (2007) Macromol. Rapid Commun. 28, 1871-1876.

Webster OW, Gentry FP, Farlee RD, Smart BE. (1992) Makromol. Chem., Macromol. Symp. 54(55), 477-482.

Wood CD, Tan B, Trewin A, Niu HJ, Bradshaw D, Rosseinsky MJ, Khimyak YZ, Campbell NL, Kirk R, Stockel E, Cooper Al. (2007) Chem. Mater. 19, 2034-2048.

Yu A, Shantarovich V, Merkel TC, Bondar VI, Freeman BD, Yampolskii Y. (2002) Macromolecules. 35, 9513-9522.

International Search Report/Written Opinion for PCT/CA2010/000323 dated Jun. 22, 2010.

CARBOXYLATED POLYMERS OF INTRINSIC MICROPOROSITY (PIMS) WITH TUNABLE GAS TRANSPORT PROPERTIES

CROSS-REFERENCE TO RELATED APPLICATIONS

This application is a national phase entry of International Patent Application PCT/CA2010/000323 filed Mar. 10, 2010 and claims the benefit of U.S. Provisional Patent Application Ser. No. 61/213,031 filed Apr. 30, 2009, the entire contents of both of which are herein incorporated by reference.

FIELD OF THE INVENTION

The present invention relates to membranes for gas separation, particularly to membranes of carboxylated ladder polymers, and to processes for producing such membranes.

BACKGROUND OF THE INVENTION

Microporous materials (pore size <20 Å) are of great technological importance for adsorption, separation and heterogeneous catalysis due to their large and accessible surface areas (typically 300-1500 m²/g). Two main classes of inorganic microporous materials, zeolites (aluminosilicate) and activated carbons, are widely used in industry. In addition, extensive research has been carried out in last ten years to produce intrinsically microporous polymeric materials (Davankov 1990, Tsyurupa 2002, Webster 1992, Urban 1995, Wood 2007, Masuda 1983, Nagai 2001, Tanaka 1992, Weber 2007, Yu 2002, Pinnau 1996, Dai 2004). These novel polymers mimic the microporous structure of inorganic materials but also offer numerous advantages, such as good processibility, broader range of physical properties and potential for introducing functionality.

During the last four years, the groups of Budd and McKeown (Budd 2004a, Budd 2004b, McKeown 2005a, Budd 2005, McKeown 2005b) have reported dioxane-based ladder polymers of intrinsic microporosity (PIMs) which possess an amorphous microporous glassy structure with good processability. These PIMs derive their properties from their highly rigid and contorted ladder structures, which can prevent efficient chain packing and offer extraordinarily high surface areas. Since the initial reports of Budd and McKeown, other groups have broadened this work to explore different polymerization techniques or produce structurally different PIMs, which maintain high permeability (e.g., oxygen permeability, $P_{O_2}$>100 Barrer) combined with a selectivity that often exceeds the Robeson upper bound. However, only a few such polymers have been reported that provide robust, high molecular weight materials for gas permeability measurements (Budd 2004a, Ghanem 2008, Carta 2008, Du 2008) because of the lack of suitably reactive monomers for polycondensation.

Although a fully hydrolyzed PIM-1 has been mentioned in a patent application (Scheme K, compound 71 of McKeown 2005a), no details regarding hydrolysis procedures, characterization of the main chain structure, film formation and gas separation properties were reported. Further, there is no recognition that the degree of hydrolysis can be controlled to tune the properties of the polymer.

In our previous work, monomers were synthesized for the preparation of structurally new PIMs, whereby gas permeability, selectivity and other properties were tuned to adjust the interchain spacing and to enhance the chain rigidity (Du 2008, Du in press). Although several high molecular weight PIMs were recently prepared by polycondensation of new synthetic monomers, there remains a need for polymers that may be used to provide films for a variety of gas separation applications.

SUMMARY OF THE INVENTION

There is provided a film comprising a carboxylated polymer of formula (I):

wherein sum of x, y and z is an integer from 10 to 10,000 and degree of hydrolysis is 0.05 or greater.

Preferably, the sum of x, y and z is an integer from 40 to 1500, more preferably 40 to 1000. Preferably, the degree of hydrolysis is 0.1 or greater, more preferably 0.15 or greater. Preferably, the degree of hydrolysis is 0.99 or less, for example 0.95 or less.

There is further provided a process for preparing a film of the present invention comprising: casting a film of a polymer of formula (II):

wherein n is an integer from 10 to 10,000, and hydrolyzing all or a portion of the —CN groups to form —COOH groups. Preferably n is an integer from 40 to 1500, more preferably from 40 to 1000. Hydrolysis is preferably performed using an aqueous base. The base may be, for example, an alkali metal hydroxide, an alkaline earth metal hydroxide, ammonium hydroxide or an alkali metal alcholate (e.g. sodium ethanolate). The base is preferably an alkali metal hydroxide or alkali metal alcholate, preferably in admixture with water or water and a co-solvent. The co-solvent may be, for example, an alcohol (e.g. methanol). The temperature and time of the hydrolysis reaction depend on the degree of hydrolysis desired. Longer reaction times and higher temperatures generally lead to greater degree of hydrolysis. The temperature is preferably 25° C. or greater, more preferably 65° C. or greater. Reaction times are preferably 0.5 hours or greater, more preferably 1 hour or greater. Temperatures in a range of 65-120° C. and times in a range of 1-48 hours may be particularly mentioned.

There is further provided a method of preparing a gas separation membrane for a target application comprising: identifying a gas pair selectivity required for the target application; correlating the required gas pair selectivity to a degree of hydrolysis of a carboxylated polymer of formula (I); and, providing a film of the carboxylated polymer having the degree of hydrolysis.

Films of the present invention are useful as materials for gas separation, vapor separation, adsorbents and catalysis. Applications include, for example, oxygen enrichment (oxygen-nitrogen separation), natural gas treatment (carbon dioxide-methane separation) and carbon dioxide capture from emissions (carbon dioxide-nitrogen separation). The films may be conveniently cast in any suitable form, for example free-standing membranes, dense films or coated films or membranes on support materials (e.g. thin film composite membranes).

Films of the present invention preferably have gas pair selectivities 1.1 times or more greater, more preferably 1.25 times or greater, than the corresponding gas pair selectivity of films cast from a polymer of formula (II) (i.e. PIM-1). Increases in gas selectivity can be up to or even higher than 3.5 times greater than PIM-1. The extent of increase in gas selectivity depends on the gas pair. Particularly noteworthy gas pairs are $O_2/N_2$, $CO_2/N_2$, $He/N_2$ and $H_2/N_2$.

Films of carboxylated polymers of intrinsic microporosity (carboxylated-PIMs) disclosed herein are high-performance materials for membrane-based gas separation. Since individual membrane gas separation applications often require certain gas selectivity ranges to be viable, the present films offer an unexpected way to tune the selectivity of the gases to an optimal required range. By adjusting the degree of hydrolysis of the carboxylated polymers in the present films, it is now possible to conveniently provide membranes for a large variety of gas separation applications. The post-modification approach of the present invention provides a convenient alternative route to such PIM materials over polycondensation of monomers.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

PIM-1 (●) 1, reported by Budd et al. at 200 mbar (2.90 psia) feed pressure at 30° C. Budd 2005a); 2, reported by Budd et al. at 1 atm (14.7 psig) feed pressure at 23° C. Budd 2008); 3, reported by Staiger et al. at 4 atm (58.8 psia) feed pressure 35° C. (Staiger 2008; 4, reported by Du et al. at 4.4 atm (50 psig) feed pressure 25° C. (Du 2008); 5, the membrane was prepared using an identical procedure to those used for preparing the carboxylated-PIMs and tested at 4.4 atm (50 psig) feed pressure at 25° C. Carboxylated-PIMs at 4.4 atm (50 psig) feed pressure at 25° C. (Δ) [6, 25° C.-0.5 h; 7, 25° C.-5 h; 8, 25° C.-24 h; 9, 25° C.-48 h]. (∇) [10, 65° C.-8 h; 11, 65° C.-24 h; 12, 65° C.-48 h]. (◊) [13, 120° C.-3 h; 14, 120° C.-5 h].

DESCRIPTION OF PREFERRED EMBODIMENTS

Carboxylated PIM membranes were prepared by in-situ hydrolysis of the nitrile groups of PIM-1 films. Structural characterization was performed by Fourier transform infrared spectroscopy (FTIR) and proton nuclear magnetic resonance ($^1$H NMR). The degree of hydrolysis was determined by carbon elemental analysis. The thermal properties were evaluated by differential scanning calorimetry (DSC) and thermogravimetric analysis (TGA). Compared with PIM-1, carboxylated-PIMs with different degrees of hydrolysis have similar thermal and mechanical properties, but surprisingly show higher selectivity for gas pairs such as $O_2/N_2$, $CO_2/N_2$, $He/N_2$ and $H_2/N_2$, with a corresponding decrease in permeability. Selectivity coupled with high permeability combines to exceed the Robeson upper-bound line for the $O_2/N_2$ gas pair. The fully hydrolyzed PIM-1 film, dicarboxylated-PIM, maintained good processability since it could be dissolved in polar aprotic solvents such as DMF, DMAc and NMP.

The present invention demonstrates that significant improvements in gas separation properties may be obtained through post-modification of nitrile-based PIM membranes, providing means to tune selectivity and permeability by varying hydrolysis reaction conditions, which can be feasibly applied to industrial application. The present invention improves the understanding of the relationship of structure/permeation properties, and also extends the PIM spectrum beyond those reported previously. In addition, the incorporation of carboxylic acid sites has the potential for further modification reactions such as grafting and crosslinking.

Materials:

Dimethylacetamide (DMAc, Sigma-Aldrich), toluene (Sigma-Aldrich), methanol (MeOH, Sigma-Aldrich), sodium hydroxide (Sigma-Aldrich), chloroform (Sigma-Aldrich) were used as received. 5,5',6,6'-Tetrahydroxy-3,3,3',3'-tetramethylspirobisindane (TTSBI, Sigma-Aldrich) was purified by crystallization from methanol. Tetrafluoroterephthalonitrile (TFTPN, Matrix scientific) was purified by vacuum sublimation at 150° C. under inert atmosphere.

Characterization Methods:

The structures of the polymeric materials were fully characterized using nuclear magnetic resonance (NMR) spectroscopy at different temperature. NMR analyses were recorded on a Varian Unity Inova™ spectrometer at a resonance frequency of 399.961 MHz for $^1$H and 376.276 MHz for $^{19}$F. $^1$H and $^{19}$F NMR spectra were obtained from samples dissolved in CDCl$_3$ or DMSO-d$_6$ using a 5 mm pulsed field gradient indirect detection probe. The solvent signals (CDCl$_3$ $^1$H 7.25 ppm; DMSO-d$_6$ $^1$H 2.50 ppm) were used as the internal references. An external reference was used for $^{19}$F NMR: CFCl$_3$ 0 ppm.

Molecular weight and molecular weight distributions were measured by GPC using Ultrastyragel™ columns and THF as the eluent at a flow rate of 1 mL/min. The values obtained were determined by comparison with a series of polystyrene standards.

FTIR (Fourier transformed infrared) spectra were recorded on Perkin-Elmer FTIR microscope with film samples at 8 cm$^{-1}$ resolution over the 400-4000 cm$^{-1}$ range. Each sample was scanned 50 times.

Elemental analysis was carried out with a thermoquest CHNS—O elemental analyzer.

Polymer thermal degradation curves were obtained from thermogravimetric analysis (TGA) (TA Instruments model 2950). Polymer samples for TGA were initially heated to 120° C. under nitrogen gas and maintained at that temperature for 1 h for moisture removal and then heated to 600° C. at 10° C./min for degradation temperature measurement. Glass transition temperatures (T$_g$) were observed from differential scanning calorimetry (DSC) (TA Instruments model 2920), and samples for DSC were heated at 10° C./min under a nitrogen flow of 50 mL/min, then quenched with liquid nitrogen and reheated at 10° C./min for the T$_g$ measurement.

Dense polymer films for gas permeability measurements were prepared from 1-2 wt % PIM-1 solutions in chloroform. PIM-1 solutions were filtered through 0.45 μm polypropylene filters and then cast into Teflon™ Petri dishes in a glove box and allowed to evaporate slowly for 1 day. The membranes were soaked in methanol and dried in a vacuum oven at 100° C. for 24 h. The resulting membranes with thickness in the range of 70-90 μm were bright yellow and flexible. The absence of residual solvent in the membranes was confirmed by weight loss tests using TGA. The PIM-1 membranes were soaked in 20 wt % sodium hydroxide solution (H$_2$O:Methanol=1:1). After hydrolyzing at different temperatures for different hydrolysis times, the membranes were boiled in water (with a few drops HCl, pH=4-5) for 2 h. Following several washing cycles in water, the membranes were soaked in methanol for 1 h, then allowed to dry at ambient temperature. Finally, the membranes were dried in a vacuum oven for 24 h by gradually increasing the temperature from ambient to 100° C.

Permeability coefficients (P) of N$_2$, O$_2$, He, H$_2$, and CO$_2$ were determined at 25° C. at a feed pressure of 50 psig and atmospheric permeate pressure using the constant-pressure/variable-volume method. The permeation flow was measured using a bubble flow meter, with the exception of CO$_2$, which was measured by a mass flow meter (Agilent ADM 2000). P was calculated by using a following equation:

$$P = \left(\frac{273}{T}\right) \cdot \left(\frac{dV}{dt}\right) \cdot \left(\frac{l}{\Delta p \cdot A}\right)$$

where dV/dt is the permeate-side flow rate (cm$^3$/s), T is the operation temperature (K) and Δp is the gas pressure differential between the upstream and downstream sides of the membrane. The membrane effective area (A) was 9.6 cm$^2$.

EXAMPLE 1

Preparation of Films of Carboxylated PIM-1

Figure 1:
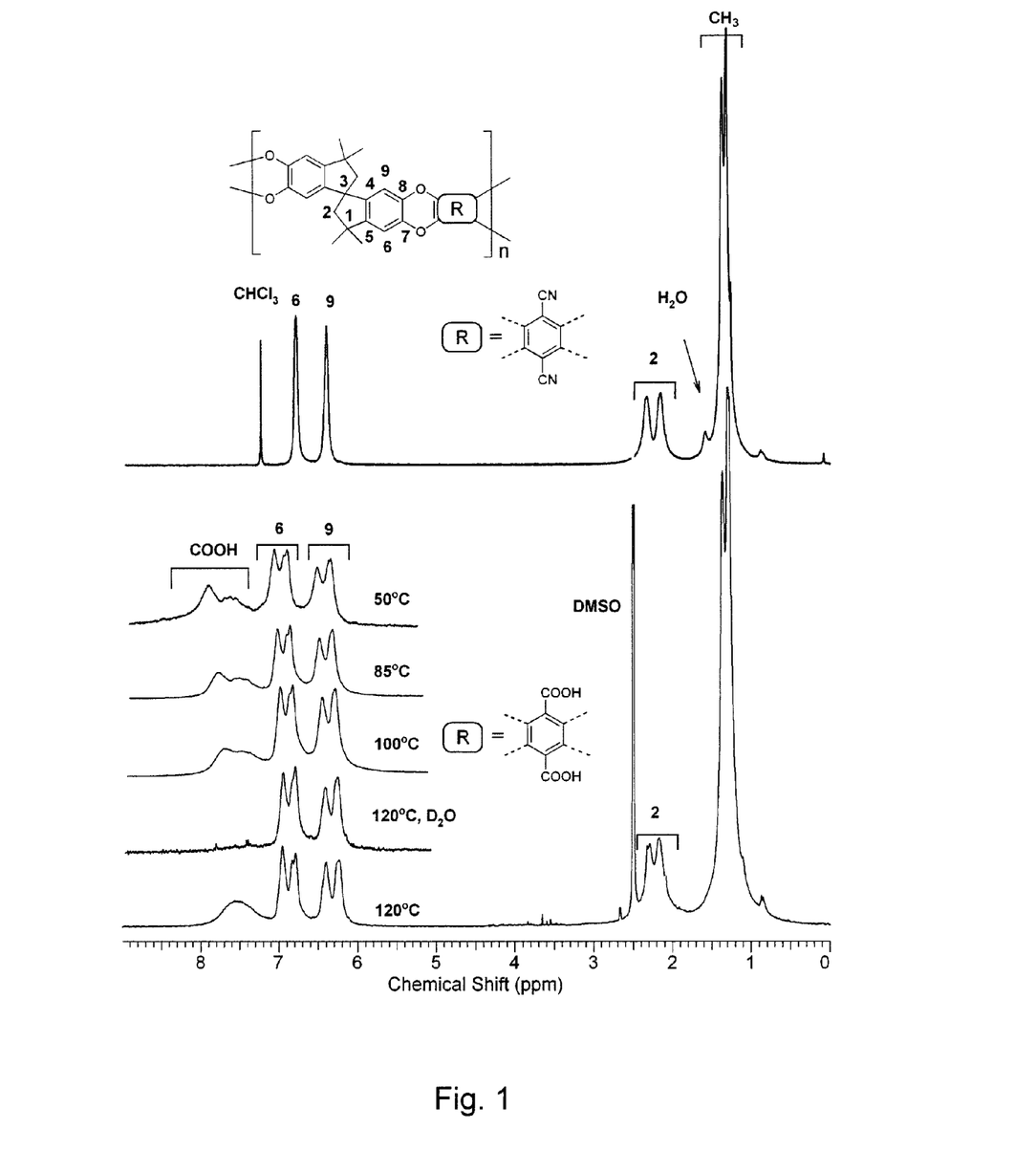
FIG. 1 depicts $^1H$ NMR spectra of PIM-1 and fully carboxylated-PIMs (120° C.-5 h).

In the present work, the PIM-1 starting material used for the hydrolysis experiments was gel-free and had high molecular weight (Mn=50,000, PDI=2.0), which was obtained under an optimized polycondensation process (Du 2008). Dense PIM-1 films were prepared from 1-2 wt % polymer solutions in chloroform, which were filtered through 0.45 μm polypropylene filters and then cast onto glass Petri dishes in a glove box and allowed to evaporate slowly for 1 day. The resulting membranes with thicknesses in the range of 70 to 90 μm were soaked in 20% sodium hydroxide solution ($H_2O$:Methanol=1:1) at different temperatures. Scheme 1 shows possible resulting repeat units derived from different degrees of hydrolysis. Polymer repeat units may contain zero, one or two nitrile groups and correspondingly have two, one or zero carboxylic acid groups. At low temperatures (25° C. and 65° C.), the hydrolysis reaction occurred rapidly during the initial stage, but slowed down after 24 h, as demonstrated by FTIR and 1H NMR measurements. At elevated temperature (reflux at 120° C.) the hydrolysis reaction was complete within 5 h.

the H nuclei) (Silverstein 1997a) while other aromatic and aliphatic protons are often left unchanged. The spectra of FIG. 1 are a good example of what can happen to the shape and shift of —COOH proton signals while H-bonding is affected by temperature changes. Increased temperature disrupts the hydrogen bonding and gradually shifts the —COOH signals to lower frequencies (less H-bonding). A drop of $D_2O$ was added in the tube and its immediate effect observed in the $^1H$ NMR spectrum (FIG. 1). The —COOH protons exchanged with the deuterium nuclei of $D_2O$; hence, proving the presence of labile protons from the —COOH groups. It is worth mentioning that the full spectrum of carboxylated PIM displayed in FIG. 1 (120° C.) was acquired with a water suppression pulse sequence that resulted in the absence of a Scheme 1: Reaction scheme of hydrolysis of PIM-1

EXAMPLE 2

NMR and FTIR Characterization of Carboxylated PIM-1

The fully carboxylated-PIM (120° C.-5 h) was characterized by $^1H$ and $^{19}F$ NMR spectroscopy. Stacked $^1H$ NMR spectra of PIM-1 in $CDCl_3$ and carboxylated-PIM in DMSO-$d_6$ (120° C.-5 h) are displayed in FIG. 1 along with peak assignments derived from 2D-NMR. The intensities and the shapes of the carboxylated-PIM polymer $^1H$ NMR signals were monitored at different NMR probe temperatures: 50° C., 85° C., 100° C., 120° C. The observed peak intensity ratio for the aromatic (5.75-8.50 ppm, H-6, 9 and COOH) and aliphatic (0.25-2.4 ppm, H-2 and $CH_3$) regions was exactly 6H:16H as expected from the molecular structure. Furthermore, the broad peaks in the 7.1-8.5 ppm area changed shape with increasing temperature. It is well known in NMR spectroscopy that changes in the sample temperature will affect the mobility of the molecules, and hence, the shape of the signals. This is particularly noticeable with protons involved in hydrogen bonding (exchange rate, electron density around water peak at 3.7 ppm. Finally, the polymers were scanned for $^{19}F$ NMR signals and no fluorine atoms were detected.

Figure 2:
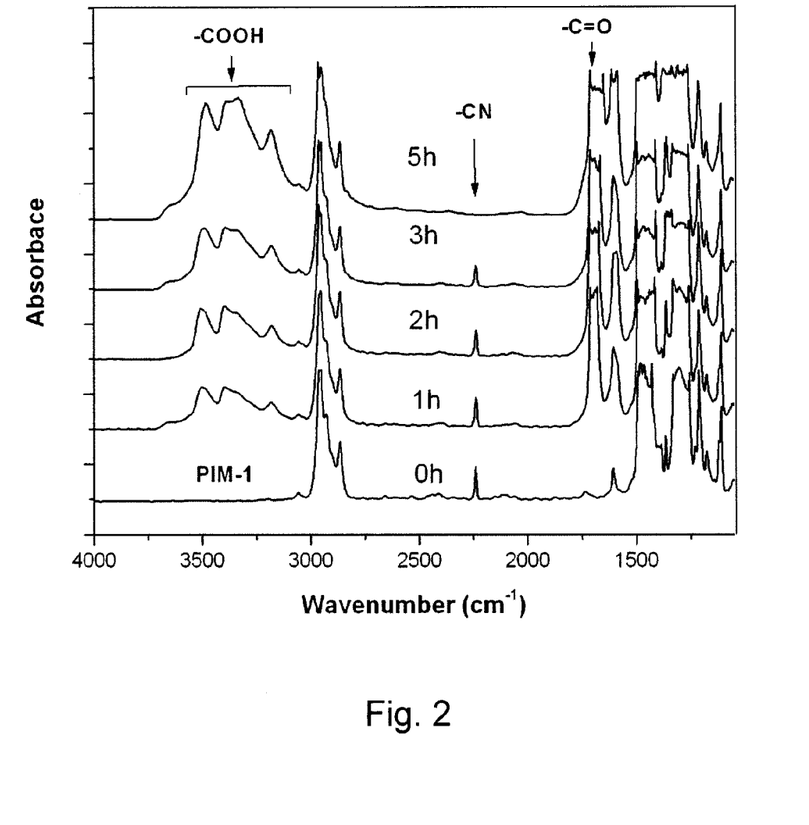
FIG. 2 depicts FTIR spectra of PIM-1 membrane and carboxylated-PIMs membranes (hydrolysis time of PIM-1: 0 h; 1 h; 2 h; 3 h; 5 h).

The FTIR spectra of the progress of hydrolysis at 120° C. at different reaction times to produce carboxylated-PIM membranes are shown in FIG. 2. PIM-1 (0 h) shows the characteristic nitrile absorption band at 2238 $cm^{-1}$, while the absence of absorption bands in the range of 3000 to 3600 $cm^{-1}$ indicates no carboxylic acid group is present. After a one hour hydrolysis reaction time at 120° C., the relative intensity of the nitrile absorption band decreased compared with other bands. Broad strong absorptions comprising three bands are observed in the range of 3000 to 3600 $cm^{-1}$, corresponding to O—H⋯O—H stretching vibrations. A narrow intense absorption near 1700 $cm^{-1}$ arises due to stretching vibration of the C═O group. These combined bands imply that some of the nitrile groups were converted into carboxylic acid groups. It is notable that the three bands in the range of 3000 to 3600 $cm^{-1}$ represent three possible types of O—H stretching vibrations in carboxylated-PIM membrane: free carboxylic acid structure (3500 $cm^{-1}$), hydrogen-bonded carboxylic acid dimers (3300 $cm^{-1}$) and O—H hydrogen-bonded with dioxane (3100 $cm^{-1}$) (Silverstein 1997b). This result is consistent with $^1$H NMR results but more delicate. In addition, absorption near 1600 cm$^{-1}$ is observed in carboxylated-PIMs and PIM-1, but is quite weak in PIM-1. It is presumed that this band is comprised of the stretching vibrations of C=O and aromatic C—C. The C=O band is shifted to lower frequencies (from 1700 cm$^{-1}$ to 1600 cm$^{-1}$) than those observed for free carboxylic acid due to strong hydrogen bonding. In addition, it is also considered that the intensity of the aromatic C—C band might increase because the center of symmetry in the aromatic ring is generally weaker in carboxylated benzene than in the one containing nitrile (Silverstein 1997, Clerc 1983). In order to prove that nitrile groups were converted into carboxylic acid groups, the hydrolysis reaction time was extended. The relative height of the C=O carboxylic acid absorption band increased obviously and the nitrile absorption band decreased until it disappeared after a 5 h reaction time, indicating that nitrile groups were completely hydrolyzed into carboxyl groups.

EXAMPLE 3

Determining Degree of Hydrolysis of Carboxylated PIMs

Figure 3:
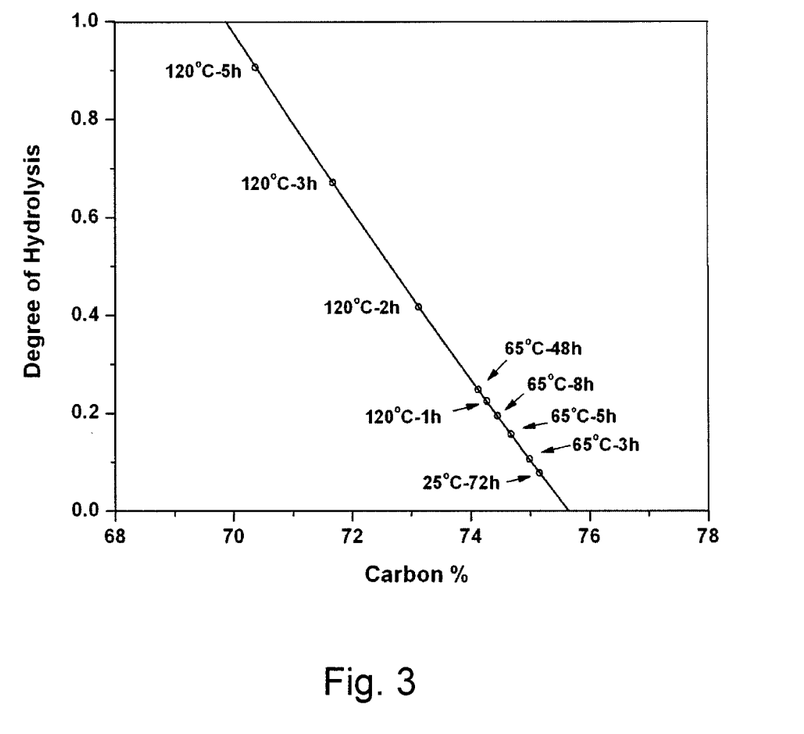
FIG. 3 depicts a relationship between degree of hydrolysis and carbon content for carboxylated-PIMs.

Generally, the intensities of —CN absorption bands can be used to calculate the approximate degree of hydrolysis. However, in the particular case of PIM-1 hydrolysis, where two symmetrical para-substituted —CN groups occur, symmetrical —CN groups have different intensities from asymmetrical —CN groups, which would occur after hydrolysis. Therefore, the degree of hydrolysis cannot be conveniently determined quantitatively by FTIR spectra. However, a relationship between degree of hydrolysis and carbon content of the polymer can be conveniently established using the following equations: $C=348.3/(460.48+38H)$ or $H=(348.3-460.48C)/38C$, where C is the carbon content and H is hydrolysis degree. A standard calibration line obtained by calculation is plotted in FIG. 3. The carbon content of the carboxylated-PIMs can be detected by elemental analysis, thus the degree of hydrolysis can be ascertained from the line. Because carboxylated-PIM is prone to water absorption from ambient air, the measured carbon content could be somewhat lower than the actual one, which would result in slightly lower degree of hydrolysis values. Nevertheless, this method appears to be a feasible way to determine the degree of hydrolysis, and was much more effective than nitrogen analysis. As seen from FIG. 3 and Table 2 (see below), the hydrolysis reaction is very fast at elevated temperature. At 120° C., 67% —CN was hydrolyzed within 3 h. It is also shown that around 90% —CN was converted into —COOH after 5 hours. However at low temperature, the reaction proceeds more slowly and the degree of hydrolysis is still quite low even after a prolonged reaction time. These results are in good agreement with $^1$HNMR and FTIR results.

Figure 4:
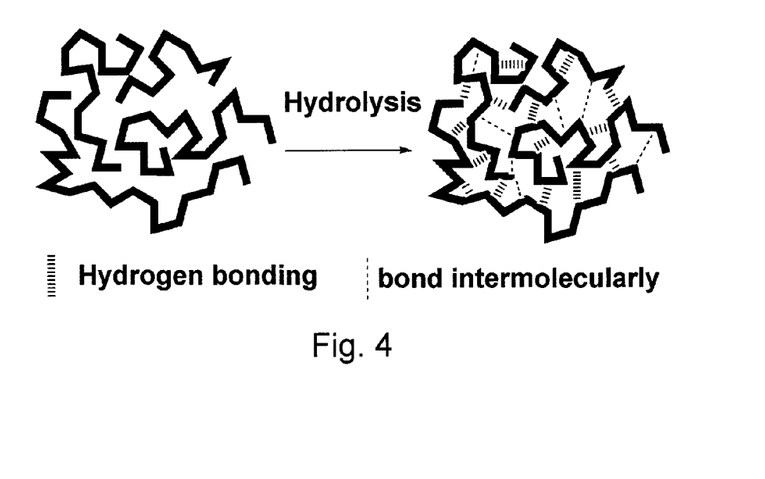
FIG. 4 depicts a representation of hydrogen or intermolecular bonding in carboxylated-PIMs.

The reason that the hydrolysis reaction proceeds more slowly than the initial reaction can be explained plausibly by the FTIR spectra. The hydrolysis of some of the nitrile groups to carboxylic acid groups provides the conditions for dimer formation due to strong hydrogen bonding of —COOH groups, or intermolecular hydrogen bonding of —OH with dioxane, which leads to the build up an impermanent network (as shown in FIG. 4). This could retard access of the hydrolysis reagent (sodium hydroxide or other base and solvent) into the polymer membrane or material. At elevated temperatures, the hydrogen or intermolecular bonds are weaker and the network is broken, such that the hydrolysis reagent can access the nitrile groups more easily, resulting in a faster reaction rate. After 5 h at 120° C., the hydrolyzed membrane is still flexible and strong enough. As shown in Table 1 (see below), the mechanical properties of carboxylated-PIMs are only slightly lower than those of PIM-1.

EXAMPLE 4

Thermal Analysis of Carboxylated PIMs

Thermal analyses of carboxylated-PIMs and PIM-1 are summarized in Table 1. None of the polymers have a discernable $T_g$ in the measured range of 50° C. to 350° C. TGA experiments showed that all the carboxylated-PIMs have good thermal stabilities and the actual onset temperature of decomposition in nitrogen is above 250° C. There is also a trend between $T_d$ and the degree of hydrolysis. Generally, nitrile-containing polymers have high thermal stability, likely due to strong dipolar interactions. Table 1 shows that with increasing degree of hydrolysis, the $T_d$ onset decreased. However, all carboxylated-PIMs still show very good thermal stability, even after complete hydrolysis of nitrile to carboxylic acid groups.

PIM-1 is readily soluble in tetrahydrofuran (THF), dichloromethane ($CH_2Cl_2$), chloroform ($CHCl_3$), but insoluble in polar aprotic solvents such as dimethylformamide (DMF), dimethylacetamide (DMAc), and N-methylpyrrolidone (NMP). After partial hydrolysis at 120° C., the hydrolyzed PIM-1 membrane was no longer soluble in $CH_2Cl_2$ and $CHCl_3$, but it was still partly soluble in THF. With further hydrolysis, THF was a non-solvent and DMF, DMAc and NMP were good solvents for the hydrolyzed PIM-1 membrane, indicating that the carboxylated-PIMs still have good processability.

TABLE 1

Mechanical and thermal properties of carboxylated-PIMs

| Polymers | $T_d$ (° C.)[a] | $T_d$ (° C.)[b] | $T_{d5}$ (° C.)[c] | RW (%)[d] | Tensile stress at break (MPa) | Tensile strain at break (%) |
|---|---|---|---|---|---|---|
| PIM-1 | 384 | 505 | 495 | 77 | 45.1 | 7.2 |
| 120° C.-1 h | 309 | 485 | 472 | 70 | 45.2 | 7.0 |
| 120° C.-2 h | 291 | 485 | 460 | 69 | 47.2 | 6.7 |
| 120° C.-3 h | 282 | 475 | 448 | 68 | 58.7 | 6.5 |
| 120° C.-5 h | 258 | 390 | 406 | 63 | 39.6 | 3.7 |

[a] Actual onset temperature of decomposition.
[b] Extrapolated onset temperature of decomposition measured by TGA.
[c] Five percent weight loss temperature measured by TGA.
[d] Residue weight at 600° C. under $N_2$.

EXAMPLE 5

Gas Permeability and Selectivity of Carboxylated PIM Membranes

Gas permeabilities and selectivities of carboxylated-PIMs having different degrees of hydrolysis follow a trade-off relationship, similar to that observed for many glassy or rubbery polymers. In general, higher permeability is gained at the cost of lower selectivity and vice versa. Pure-gas permeability coefficients (P) were measured on polymer dense films of PIM-1 and carboxylated-PIMs for $O_2$, $N_2$, $H_2$, He, and $CO_2$. A summary of these P values and ideal selectivities for various gas pairs are shown in Table 2.

Figure 5:
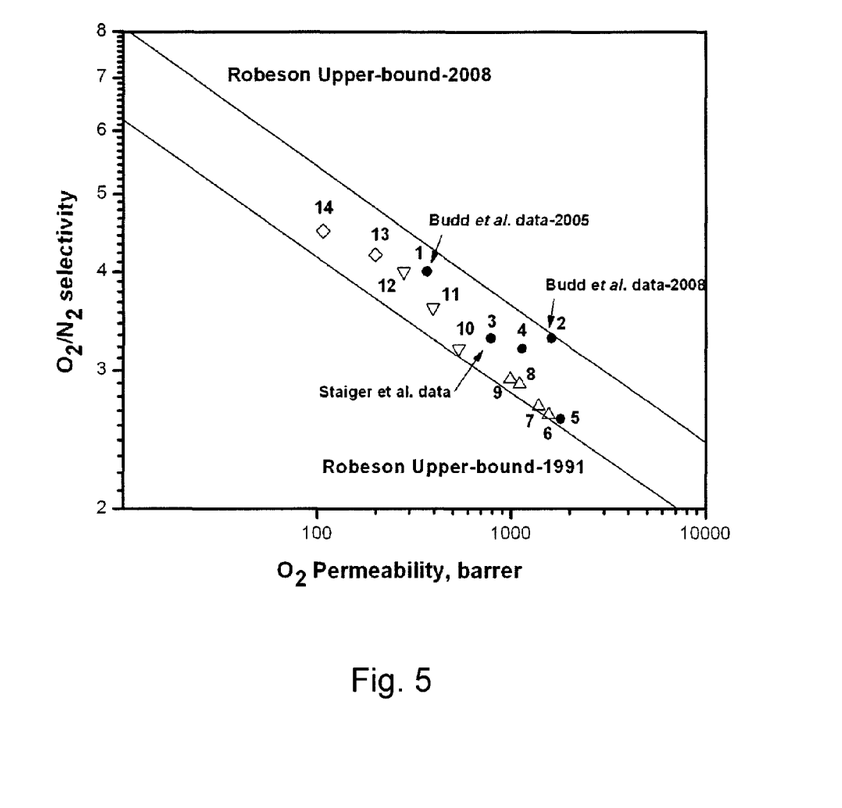
FIG. 5 depicts the relationship between $O_2$ permeability and $O_2/N_2$ selectivity for carboxylated-PIMs and PIM-1.

Gas permeability and selectivity of PIM-1 are known to be very sensitive to film preparation conditions and pre-treatment (Budd 2008). There is variation between the previously reported permeability data and the present data for PIM-1 as shown in FIG. 5. It is likely that this difference arises from the post-treatment protocol for the membranes. Different from previous work, the hydrolyzed PIM membranes were treated by first boiling in water (with HCl, pH=4-5), in order to remove sodium hydroxide and salts. After several washes in water, they were soaked in methanol, then allowed to dry naturally. Finally, the membranes were dried in a vacuum oven for 24 h by gradually increasing the temperature from ambient to 100° C. For comparison, a PIM-1 membrane was treated identically. The permeabilities of the water-treated PIM-1 membrane for all the gases are higher than previous reports, while selectivities are lower, illustrating the strong effect of processing history on performance (Budd 2005b, Du 2008, Budd 2008, Staiger 2008). The $O_2/N_2$ selectivities for PIM-1 are above the Robeson upper bound (Robeson 1991), with expected "trade-off" behavior between permeability and selectivity as shown in FIG. 5 (Robeson 1991, Robeson 2008).

TABLE 2

Gas permeabilities and pure-gas selectivities of carboxylated-PIMs and PIM-1

| Polymers | Carbon elemental analyses | P (Barrer[a]) | | | | | $\alpha^b$ | | | |
|---|---|---|---|---|---|---|---|---|---|---|
| | | $O_2$ | $N_2$ | He | $H_2$ | $CO_2$ | $O_2/N_2$ | $CO_2/N_2$ | $He/N_2$ | $H_2/N_2$ |
| PIM-1 | / | 1790 | 727 | 1368 | 3580 | 8310 | 2.5 | 11 | 1.9 | 4.9 |
| 25° C.-0.5 h | / | 1555 | 615 | 1284 | 3143 | 6715 | 2.5 | 11 | 2.0 | 5.1 |
| 25° C.-5 h | / | 1384 | 523 | 1204 | 2885 | 6294 | 2.7 | 12 | 2.3 | 5.5 |
| 25° C.-24 h | / | 1107 | 385 | 1022 | 2510 | 5133 | 2.9 | 13 | 2.7 | 6.5 |
| 25° C.-48 h | / | 990 | 338 | 990 | 2265 | 4775 | 2.9 | 14 | 2.9 | 6.7 |
| 25° C.-72 h | 75.13 | 784 | 282 | 837 | 1902 | 3924 | 2.8 | 14 | 3.0 | 6.8 |
| 65° C.-1 h | / | 1053 | 369 | 980 | 2370 | 4586 | 2.9 | 12 | 2.6 | 6.4 |
| 65° C.-3 h | 74.97 | 842 | 284 | 870 | 2247 | 3965 | 3.0 | 14 | 3.1 | 7.9 |
| 65° C.-5 h | 74.65 | 600 | 187 | 627 | 1720 | 2990 | 3.2 | 16 | 4.2 | 9.3 |
| 65° C.-8 h | 74.44 | 540 | 164 | 680 | 1521 | 2656 | 3.3 | 16 | 4.2 | 9.3 |
| 65° C.-16 h | / | 470 | 138 | 607 | 1407 | 2305 | 3.4 | 17 | 4.4 | 10 |
| 65° C.-24 h | / | 400 | 110 | 523 | 1256 | 1962 | 3.6 | 18 | 4.8 | 11 |
| 65° C.-48 h | 74.12 | 281 | 70 | 391 | 917 | 1521 | 4.0 | 22 | 5.6 | 13 |
| 120° C.-1 h | 74.29 | 534 | 162 | 616 | 1540 | 2543 | 3.3 | 16 | 3.8 | 9.5 |
| 120° C.-2 h | 73.10 | 351 | 100 | 484 | 1152 | 2060 | 3.5 | 21 | 4.9 | 12 |
| 120° C.-3 h | 71.67 | 201 | 48 | 260 | 630 | 1056 | 4.2 | 22 | 5.4 | 13 |
| 120° C.-5 h | 70.3 | 110 | 24 | 153 | 408 | 620 | 4.6 | 26 | 6.3 | 17 |

[a] Permeability coefficients measured at 25° C. and 50 psig feed pressure. 1 Barrer = $10^{-10}$ [cm$^3$(STP) · cm]/(cm$^2$ · s · cmHg).
[b] Ideal selectivity $\alpha = (P_a)/(P_b)$.

Surprisingly, all the carboxylated-PIMs exhibited higher $O_2/N_2$ selectivity compared with PIM-1 (No. 5 is PIM-1 which was fabricated and tested under the same conditions), coupled with reductions in gas permeabilities. From the viewpoint of molecular modeling analyses by using HyperChem™ 7.0 software, the interchain distance of the polymer is not extensively changed by introducing carboxylic acid groups into the PIM. Nitrile and carboxylic acid groups are similarly-sized small side groups, which do not have a large effect on interchain space filling. However, strong interchain hydrogen bonds may somewhat rearrange the chains, build up a network structure and enhance the rigidity of polymer chains, which would lead to lower permeability and higher selectivity. This hypothesis is in good agreement with the FTIR spectral analysis. The intrinsic intermolecular force of these carboxylated-PIMs is expected to be independent of processing. The amount of hydrogen bonding network structures can be controlled by temperature and reaction time. Thus, post-modification of PIM-1 by various hydrolysis conditions is a simple method to adjust or tune the gas permeability and selectivity.

References: The contents of the entirety of each of which are incorporated by this reference.

Budd P M, Ghanem B S, Makhseed S, McKeown N B, Msayib K J, Tattershall C E. (2004a) *Chem. Commun.* 230-231.

Budd P M, Elabas E S, Ghanem B S, Makhseed S, McKeown N B, Msayib K J, Tattershall C E, Wong D. (2004b) *Adv. Mater.* 16, 456-459.

Budd P M, Msayib K J, Tattershall C E, Reynolds K J, McKeown N B, Fritsch D. (2005) *J. Membr. Sci.* 251, 263-269.

Budd P M, McKeown N B, Ghanem B S, Msayib K J, Fritsch D, Starannikova L, Belov N, Sanfirova O, Yampolskii Y, Shantarovich V. (2008) *J. Membr. Sci.* 325, 851-860.

Carta M, Msayib K J, Budd P M, McKeown N B. (2008) *Org. Lett.* 10, 2641-2643.

Clerc P, Simon S. (1983) *Table of Spectral Data for Structure Determination of Organic Compounds*, Springer Verlag Berlin Heidelberg. p. I 165 and I 45.

Dai Y, Guiver M D, Robertson G P, Kang Y S, Lee K J, Jho J Y. (2004) *Macromolecules.* 37, 1403-1410.

Davankov V A, Tsyurupa M P. (1990) *React. Polym.* 13, 27-42.

Du N, Robertson G P, Song J, Pinnau I, Thomas S, Guiver M D. (2008) *Macromolecules.* 41, 9656-9662.

Du N, Robertson G P, Pinnau I, Thomas S, Guiver M D. (in press) *Macromolecular Rapid Communications.*

Ghanem B S, McKeown N B, Budd P M, Fritsch D. (2008) *Macromolecules.* 41(5), 1640-1646.

Masuda T, Isobe E, Higashimura T, Takada K. (1983) *J. Am. Chem. Soc.* 105, 7473-7474.

McKeown N B, Budd P M, Msayib K, Ghanem B S. (2005a) International Patent Publication WO 012397.

McKeown N B, Budd P M, Msayib K J, Ghanem B S, Kingston H J, Tattershall C E, Makhseed S, Reynolds K J, Fritsch D. (2005b) *Chem. Eur. J.* 11, 2610-2620.

Nagai K, Masuda T, Nakagawa T, Freeman B D, Pinnau I. (2001) *Prog. Polym. Sci.* 26, 721-798.

Pinnau I, Toy L G. (1996) *J. Membr. Sci.* 116, 199-209.

Robeson L M. (1991) *J. Membr. Sci.* 62, 165-185.

Robeson L M. (2008) *J. Membr. Sci.* 320, 390-400.

Silverstein R M, Webster F X. (1997) *Spectrometric Identification of Organic Compounds*, John Wiley & Sons, Inc. 6th ed.; (a) p, 163-166; (b) p. 95.

Staiger C L, Pas S J, Hill A J, Cornelius C. (2008) *J. Chem. Mater.* 20, 2606-2008.

Tanaka K, Okano M, Toshino H, Kita H, Okamoto K I. (1992) *J. Polym. Sci., Polym. Phys.* 30, 907-914.

Tsyurupa M P, Davankov V A. (2002) *React. Funct. Polym.* 53, 193-203.

Urban C, McCord E F, Webster O W, Abrams L, Long H W, Gaede H, Tang P, Pines A. (1995) *Chem. Mater.* 7, 1325-1332.

Weber J, Su Q, Antonietti M, Thomas A. (2007) *Macromol. Rapid Commun.* 28, 1871-1876.

Webster O W, Gentry F P, Farlee R D, Smart B E. (1992) *Makromol. Chem., Macromol. Symp.* 54(55), 477-482.

Wood C D, Tan B, Trewin A, Niu H J, Bradshaw D, Rosseinsky M J, Khimyak Y Z, Campbell N L, Kirk R, Stockel E, Cooper A I. (2007) *Chem. Mater.* 19, 2034-2048.

Yu A, Shantarovich V, Merkel T C, Bondar V I, Freeman B D, Yampolskii Y. (2002) *Macromolecules.* 35, 9513-9522.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A film comprising a carboxylated polymer of formula (I):

wherein sum of x, y and z is an integer from 10 to 10,000 and degree of hydrolysis is 0.05 or greater.

2. The film according to claim 1, wherein the degree of hydrolysis is 0.1 or greater.

3. The film according to claim 1, wherein the degree of hydrolysis is 0.15 or greater.

4. The film according to claim 1, wherein the degree of hydrolysis is 0.99 or less.

5. The film according to claim 1, wherein the degree of hydrolysis is 0.95 or less.

6. The film according to claim 1, wherein the degree of hydrolysis is expressed by $H=(348.3-460.48C)/38C$, wherein H is the degree of hydrolysis and C is carbon content of the polymer.

7. The film according to claim 1, having a gas pair selectivity for $O_2/N_2$, $CO_2/N_2$, $He/N_2$ or $H_2/N_2$ that is 1.1 times or more greater than a corresponding gas pair selectivity of films cast from a polymer of formula (II):

wherein n is an integer from 10 to 10,000.

8. The film according to claim 7, wherein the gas pair selectivity is 1.25 times greater.

9. The film according to claim 7, wherein the gas pair selectivity is greater for all of $O_2/N_2$, $CO_2/N_2$, $He/N_2$ and $H_2/N_2$.

10. The film according to claim 1, wherein the sum of x, y and z is an integer from 40 to 1500.

11. The film according to claim 1, wherein the sum of x, y and z is an integer from 40 to 1000.

12. The film according to claim 1 in the form of a free-standing membrane, a dense film or a coated film or membrane on support.

13. A process for preparing a film comprising: casting a film of a polymer of formula (II):

wherein n is an integer from 10 to 10,000, and hydrolyzing —CN groups to form —COOH groups to provide a degree of hydrolysis of 0.05 or greater.

14. The process according to claim 13, wherein n is an integer from 40 to 1500.

15. The process according to claim 13, wherein n is an integer from 40 to 1000.

16. The process according to claim 13, wherein hydrolysis is accomplished with an aqueous base.

17. The process according to claim 16, wherein the base is an alkali metal hydroxide or an alkali metal alcoholate.

18. The process according to claim 13 conducted at a temperature of 65° C. or greater.

19. The process according to claim 13 conducted for a time of 1 hour or greater.

20. A method of preparing a gas separation membrane for a target application comprising: identifying a gas pair selectivity required for the target application; correlating the required gas pair selectivity to a degree of hydrolysis of a carboxylated polymer of formula (I) as defined in claim 1; and, providing a film of the carboxylated polymer having the degree of hydrolysis.

* * * * *